United States Patent
Sawaguchi et al.

[11] Patent Number: 5,089,735
[45] Date of Patent: Feb. 18, 1992

[54] DIRECT-CURRENT MOTOR

[75] Inventors: Hideo Sawaguchi; Takeshi Muraoka; Kazuhiro Takahashi, all of Gunma, Japan

[73] Assignee: Sawafuji Electric Co., Ltd., Tokyo, Japan

[21] Appl. No.: 449,604

[22] Filed: Dec. 11, 1989

[51] Int. Cl.⁵ .............................................. H02K 5/10
[52] U.S. Cl. ........................................ 310/88; 310/42; 310/45; 310/68 C; 310/71; 310/89; 310/91; 310/239; 277/187
[58] Field of Search .................. 310/88, 71, 42, 43, 310/68 C, 89, 51, 239, 240, 242, 247, 249, 45, 91; 277/102, 136, 137, 187; 174/64, 65 R, 65 SS

[56] References Cited

U.S. PATENT DOCUMENTS

| | | | |
|---|---|---|---|
| 3,010,401 | 11/1961 | Granqvist | 310/68 C |
| 3,028,515 | 4/1962 | Cheetham | 310/247 |
| 3,745,393 | 6/1973 | Spors | 310/239 |
| 4,112,321 | 9/1978 | Wan | 310/245 |
| 4,112,405 | 9/1978 | Joseph | 310/68 C |
| 4,293,789 | 10/1981 | King | 310/68 C |
| 4,673,837 | 6/1987 | Gingerich | 310/43 |
| 4,801,833 | 1/1989 | Dye | 310/68 C |
| 4,851,730 | 7/1989 | Fushiya | 310/71 |
| 4,855,631 | 8/1989 | Sato | 310/239 |

FOREIGN PATENT DOCUMENTS

| | | | |
|---|---|---|---|
| 0291275 | 2/1967 | Australia | 174/65 SS |
| 2811503 | 12/1978 | Fed. Rep. of Germany | 310/68 C |
| 0046401 | 4/1977 | Japan | 310/68 C |

*Primary Examiner*—R. Skudy
*Attorney, Agent, or Firm*—McGlew & Tuttle

[57] ABSTRACT

A direct-current motor that facilitates the assembly and mounting of components of the motor, including a front bracket made of synthetic resin and defining recesses. A plurality of metallic brushholders are located in the recesses. The protection of the motor is improved by the waterproofing construction of the motor, including motor cords, and has a sturdy construction.

6 Claims, 14 Drawing Sheets

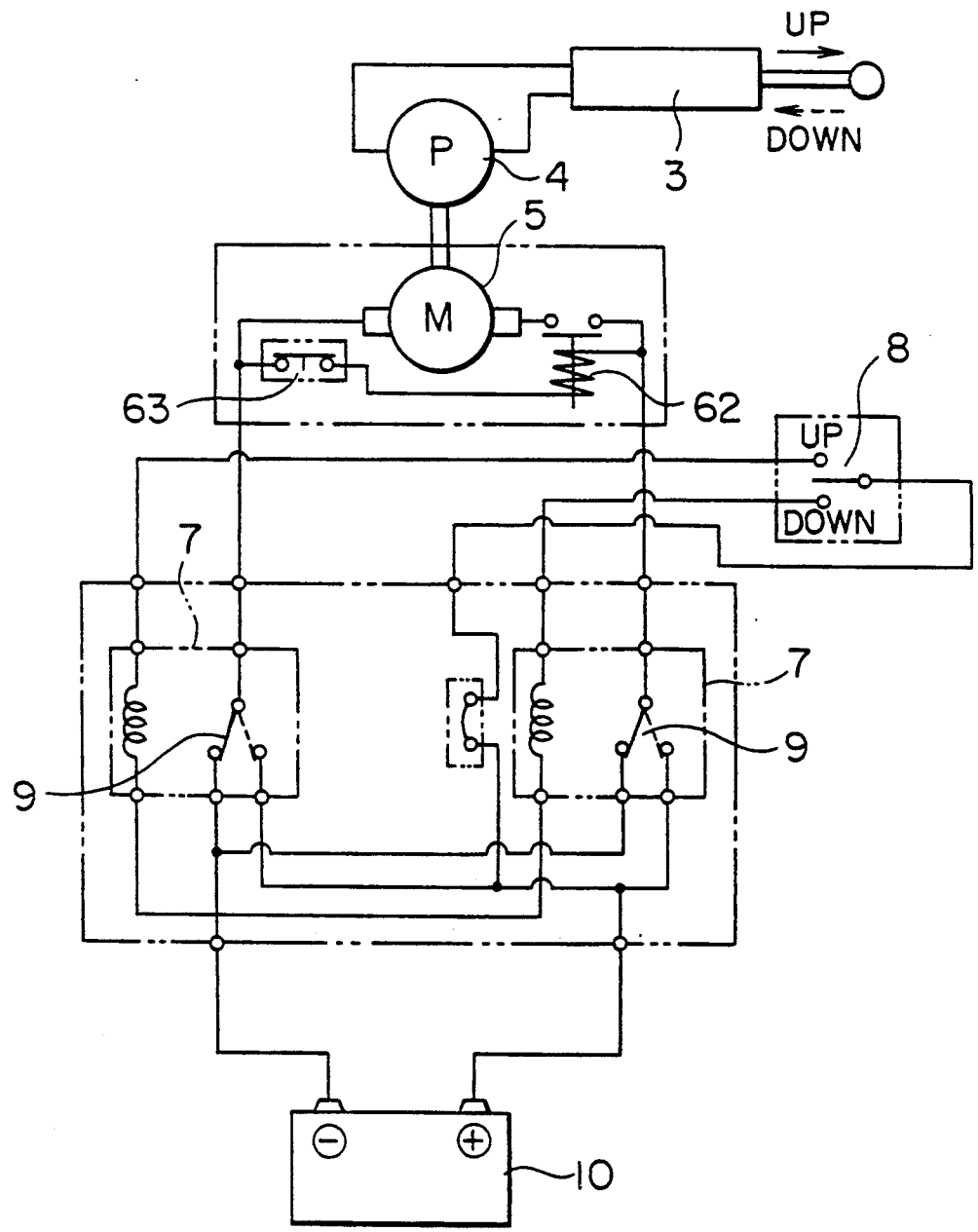

FIG. 17
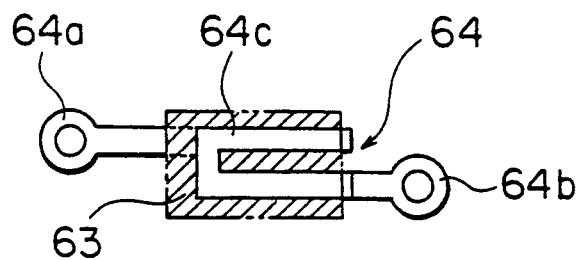
FIG. 18
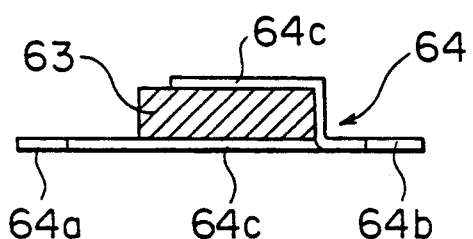
FIG. 19 FIG. 20
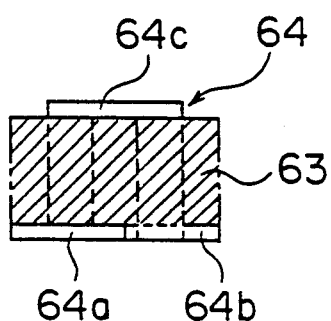 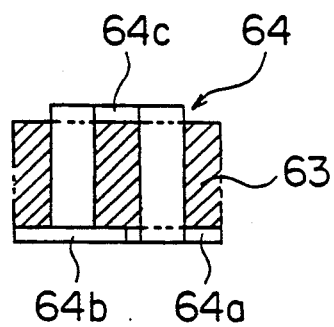
FIG. 21
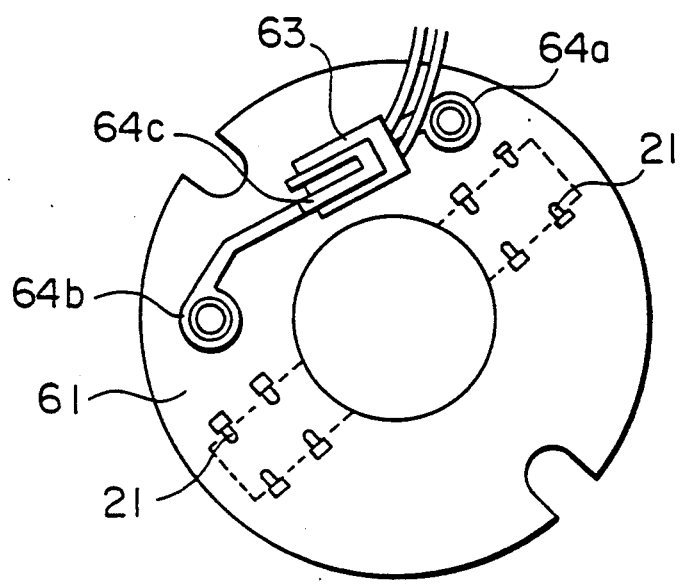

DIRECT-CURRENT MOTOR

BACKGROUND OF THE INVENTION

1. Field of the Invention

This invention relates generally to a direct-current motor, and more particularly to a direct-current motor for controlling outboard engines, for example, in which components of the direct-current motor are allowed to be easily assembled, and the protection of the motor proper and the waterproofing effect of the waterproofing construction of the motor, including motor cords are improved.

2. Description of the Prior Art

In motor boats or small fishing boats, the propeller is submerged into, or lifted from, the water by means of a hydraulic cylinder powered by the hydraulic pressure generated by a hydraulic pump driven by a direct-current motor.

FIGS. 7A and 7B show the operation of outboard engines of different constructions. In FIGS. 7A and 7B, solid lines represent the state where the outboard engines are submerged into the water, while dotted lines represent the state where the engines are lifted from the water. The lifting/lowering of a propeller 2 is effected directly by a hydraulic cylinder 3 powered by the hydraulic pressure fed by a hydraulic pump 4. The hydraulic pump 4 is driven by a motor 5. Numeral 6 denotes an engine, 7 a control relay, which will be described later.

FIG. 8 illustrates a prior-art control unit for lifting and lowering the propeller 2. When a switch 8 is thrown to the UP side or the DOWN side, any one of the two relays 7 is energized. In accordance with the operation of the contact 9 of the energized relay 7, the polarity of the current fed from a battery 10 to the motor 5 is reversed, thus causing a hydraulic cylinder 3 to be controlled to lift or lower the propeller by means of a hydraulic pump 4 driven by the motor 5. In the figure, numeral 62 refers to a power relay, and 63 to a thermal relay, respectively.

The motor 5 driving the hydraulic pump 4, which is installed out of the board as shown in FIGS. 7A and 7B, tends to be splashed with the sea water. To protect the motor from the sea water splashes, therefore, the entire motor 5, including the cord outlet, is usually made into a hermetically sealed waterproof construction.

The cord outlet of the motor 5 used in conventional outboard engines has a waterproof construction as shown in FIG. 9 or FIG. 10.

FIG. 9 is a top view of a motor 5. A space, called a pocket for filling the outlet of a cord 12 with a filling material, is provided in a front bracket 52 to which a sealing case 51 of the motor 5; the space being formed by a grommet 13 into which the cord 12 is inserted, a grommet retaining plate 14 a fixing plate 15, etc. and filled with a filling material 16, such as a resin or an adhesive, so as to embed the cord 12 into the pocket.

In the waterproof construction shown in FIG. 10, a locking claw 17a formed on a front bracket 52 into which a cord 12 is inserted, and a cord insertion hole having a tapered portion is provided inside the front bracket 52. A cap 18 has a catch claw 18a on the inside of the brim thereof and a pushing ring 18b for receiving of the cord 12 at the center thereof and pushing the end face of a grommet 19. The grommet 19 having a hole for passing the cord 12 at the center thereof is inserted into the cord insertion hole having a tapered portion inside the front bracket 52. By pushing the end face of the grommet 19 with the pushing ring 18b of the cap 18, the grommet 19 is pushed forward and compressed into the tapered portion of the cord insertion hole provided inside the front bracket 52. As a result, airtightness is maintained among the grommet 19, the cord 12 and the front bracket 52. As the cap is further pushed until the catch claw 18a of the cap 18 is engaged with the locking claw 17a of the front bracket 52, the cap 18 is locked to the front bracket 52.

In the prior-art construction shown in FIG. 9, the filling material 16 has to be heated until it solidifies. In addition, the construction shown in FIG. 9 has a number of disadvantages in terms of both sealing performance and manhours since there can be a run-off of the filling material 16, or an imperfect sealing due to an underfill of the filling material 16.

Furthermore, the construction shown in FIG. 9 involves a filling space, called the pocket, and too small a pocket would make it difficult to fill the pocket with the filling material 16. In this way, the construction shown in FIG. 9 has many drawbacks in terms of workability and design.

The construction shown in FIG. 10, on the other hand, is excellent in workability and design, but requires a shape in which the front bracket 52 protrudes outward. This precludes the use of a waterproof construction of the protruding shape as shown in FIG. 10 in a design having a limited space for providing the motor 5.

To prevent excess current from flowing in the armature coil, external wires are usually connected to brushes via a circuit breaker. In the conventional designs, the circuit breaker is housed in a specially designed case, and the case with the breaker is held by an end bracket via a holding means. This design involves the use of a special case for the circuit breaker, and requires a mechanism for holding the case. All this leads to an increase both in the number of parts and in assembly manhours.

In a direct-current motor, moreover, a brush holder has to be provided in the front bracket 52 by some means or other. In the conventional design, the brush holder is fixedly fitted to the bracket 52 using screws and other fastening means. Such a construction makes the brush holding mechanism unwantedly complex, increasing assembly manhours. To cope with this, efforts have been made to form a bracket 52 for holding brushes by molding a synthetic resin, and providing a brush holder integrally with the bracket 52, as shown in FIG. 32. In FIG. 32, numeral 5 indicates a motor; 51 a motor sealing case; 52 a front bracket; 53 a rotor; 54 a stator; 55 a brush, respectively. With such a construction, however, the bracket could be deformed due to heat when the temperature of brushes making sliding contact with the commutator rises.

Consequently, there is a need for improving the construction of the bracket 52 for holding brushes so that as many direct-current motor components as possible can be housed to make the effective use of the limited space available.

In the examples shown in FIGS. 7A and 7B, if the propeller 2 could not be lowered or lifted for some reason or other, large current might flow in the motor 5, resulting in a burn-out of the motor 5. To prevent such an accident, a thermal relay 63 is provided to detect the temperature rise in the motor 5, as shown in FIG. 8, so that when the temperature of the motor 5 exceeds a predetermined value, the thermal relay 63 is actuated to deenergize the power relay 62 to cut off power supply from the battery 10 to the motor 5. As the motor temperature drops, the thermal relay 63 is automatically reset.

FIGS. 23 through 25 illustrate the construction of the thermal relays based on the prior art. FIG. 23 is a top view, FIG. 24 a side elevation, and FIG. 25 a cross section.

As shown in FIGS. 23 through 25, the thermal relay 63 is fixedly fitted to the side of a metallic brush holder 113 for holding a brush 115 by means of a fixture 114. In the figure, numeral 115 indicates a brush making sliding contact with a commutator in a motor; 117 a brush holding plate.

The above-mentioned construction in which the thermal relay 63 is fitted in close contact with the side of the brush holder can cope with a gradual temperature rise normally encountered during overload operation of during a continuous operation for over predetermined hours. In case the propeller 2 becomes entangled with some foreign matter, causing the motor 5 to be locked, however, the temperature rise of the brush holder 113 could not follow the resulting sharp temperature rise of the brush 115, leading to the seizing of the motor 5 before the actuation of the thermal relay 63.

Furthermore, the method of assembling the commutator in a conventional direct-current motor involves the movement of the brushes outward in the radial direction while compressing the spring. This operation has to be done while pulling the so-called pig tails sideways. This operation is extremely troublesome, deteriorating the efficiency of commutator assembly.

SUMMARY OF THE INVENTION

It is an object of this invention to provide a direct-current motor which offers a sufficient waterproofing effect, has a simple construction, and involves few man-hours in assembly.

It is another object of this invention to provide a direct-current motor of such a construction that drive current is fed to an armature coil via a circuit breaker, in which one bracket in the axial direction is made of a synthetic resin molding, a recess is provided on the bracket so that the circuit breaker is housed in the recess without encasing in a case, and the recess is covered with an insulating plate.

It is still another object of this invention to provide a direct-current motor in which a bracket for holding brushes is made of a synthetic resin molding, recesses are provided on the bracket, metallic brush holders having open tops are inserted into the recesses, the brushes are held thereby, and the open tops of the brush holders are covered with an insulating plate.

It is a further object of this invention to provide a direct-current motor having a temperature protection device in which a relay holder of such a construction that the thermal relay is held in such a manner as to be wrapped inside the relay holder, and current flows in the motor via the relay holder so that the motor is prevented from burning out by detecting the temperature rise caused by the heat-up of the relay holder.

It is still a further object of this invention to provide a direct-current motor in which current is fed to a rotor coil by means of a commutator and brushes held on an insulating plate via holders; and engaging pieces are provided on the holders; the engaging pieces being inserted into engaging holes of the insulating plate and bent, and claws adapted to be bent at right angles with respect to the engaging pieces are provided; the claws coming in contact with the circumferential wall surface of the engaging holes to prevent the holders from loosening.

It is still a further object of this invention to provide a direct-current motor in which the brush holders for holding a brush have openings on the outer peripheral side, and spring receptacles are detachably installed on the openings to receive springs pushing the brushes, and the brushes can be installed from the outer peripheral side through the openings after a commutator has been installed between the brush holders.

It is still a further object of this invention to provide a direct-current motor in which an end of the commutator installed between the brushes is received by a thrust absorber, and the diameter of the thrust absorber is made larger than the diameter of the commutator, and the thrust absorber is used as a jig for pushing the brushes onto the outer peripheral side when the commutator is forced between the brushes.

One feature of this invention is that
- a bracket having a hole with a tapered portion inside thereof is drilled from the outer surface to the inside of the cord outlet,
- a grommet having a hole for receiving a cord and a tapered portion on the outer surface thereof, which compresses the cord with the tapered portion thereof, ensures airtightness when the grommet is inserted into the bracket hole,
- a collar is provided having a hole for receiving the cord and a key groove on the outer surface thereof, and
- a holder engaged into the key groove of the collar is provided in a direct-current motor having a waterproof construction for the cord outlet thereof and is, used in an outboard engine for lifting and lowering the propeller from the sea water.

Another feature of this invention is a direct-current motor in which brushes are slidably held by brush holders; the brushes being brought into contact with the commutator on the rotor side by springs housed in the brush holders; and current flowing in armature coils is changed over by the commutator and the brushes; the brush holders have openings on the outer peripheral side thereof; spring receptacles being detachably installed on the openings to accommodate springs for pushing brushes.

BRIEF DESCRIPTION OF THE DRAWINGS

FIG. 8 is a diagram illustrating an example of the construction of a control unit according to prior art for carrying out the lifting/lowering control of a propeller.

FIG. 17 is a plan view of an example of a temperature protection device for a motor according to this invention.

FIG. 18 is a front view of the temperature protection device shown in FIG. 17.

FIG. 19 is an enlarged left-side view of the temperature protection device shown in FIG. 17.

FIG. 20 is an enlarged right-side view of the same.

FIG. 21 is a diagram illustrating the assembled state of a brush holding plate to which a temperature protection device for a direct-current motor according to this invention is fitted.

DESCRIPTION OF PREFERRED EMBODIMENTS

To begin with, the overall relationship among constituent elements of a direct-current motor 5 shown in FIG. 1 will be described in the following.

Figure 2:
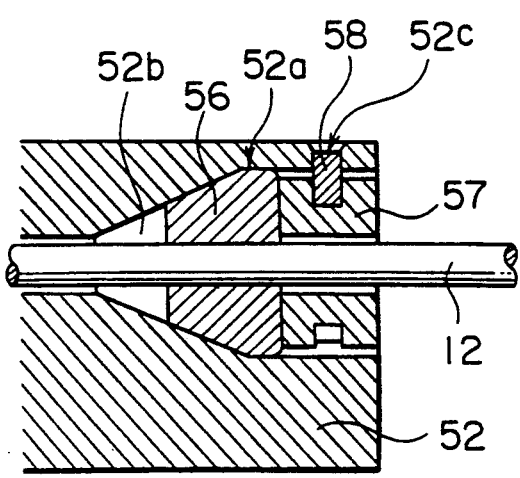
FIG. 2 is an enlarged sectional view of a cord outlet according to this invention.
Figure 3:
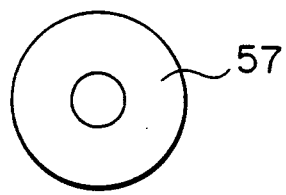
FIG. 3 is a front view of an example of an I collar.
Figure 4:
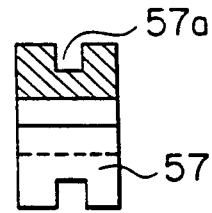
FIG. 4 is a longitudinal section of the I collar.
Figure 5:
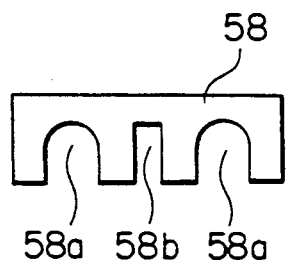
FIG. 5 is a front view of an example of an I holder.
Figure 6:
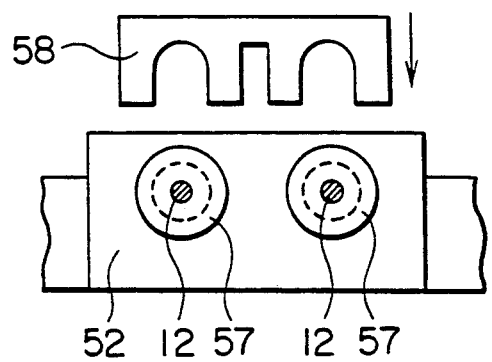
FIG. 6 is a diagram of assistance in explaining how to install an I holder.
Figure 11:
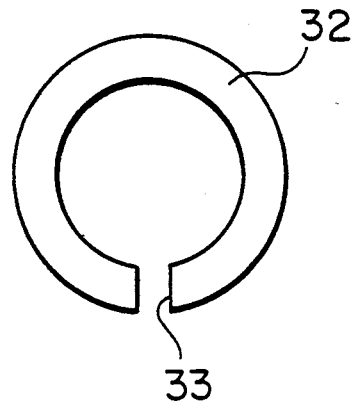
FIG. 11 is a plan view illustrating a thrust absorber.
Figure 12:
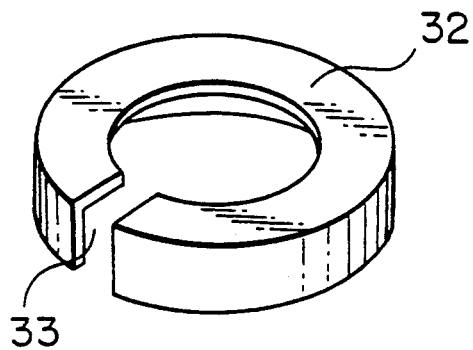
FIG. 12 is a perspective view illustrating the external appearance of the thrust absorber.
Figure 14:
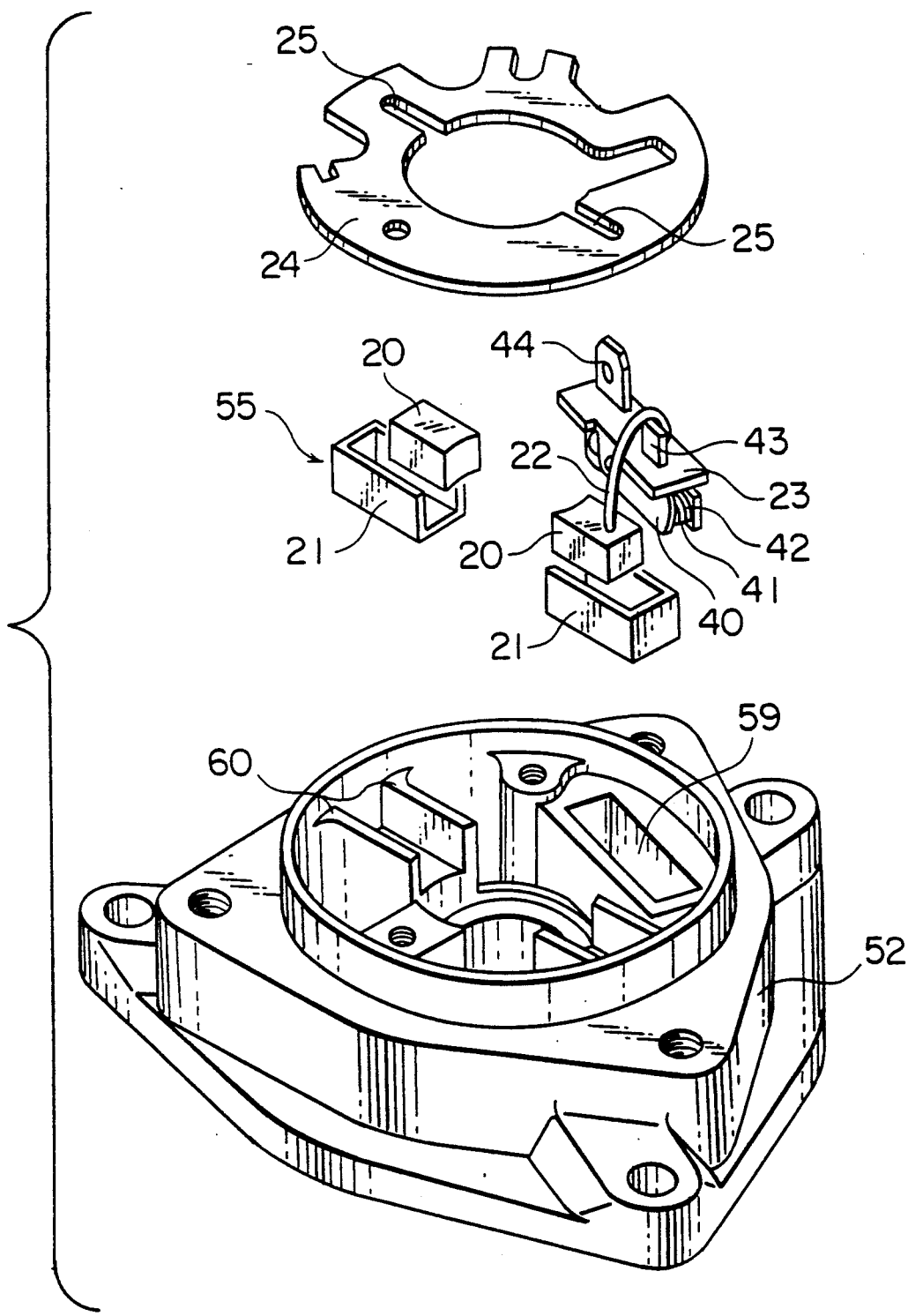
FIG. 14 is an exploded perspective view of the essential part of a circuit breaker holder of a direct-current motor of this invention.
Figure 15:
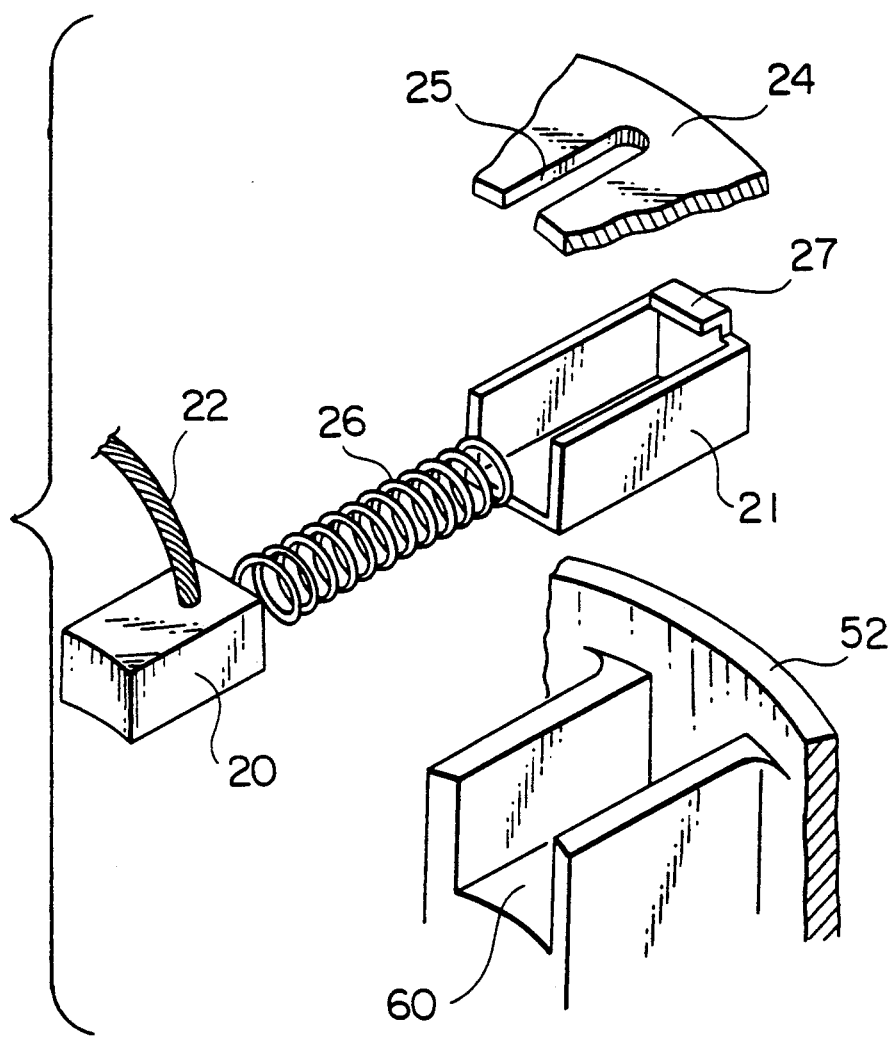
FIG. 15 is an exploded perspective view of the essential part of a brush holder of a direct-current motor of this invention.

Reference numeral 52 refers to a front bracket, the details of whose construction for receiving a cord 12 is shown in FIG. 2; 58 to an I holder, as shown in FIGS. 5 and 6; 57 to an I collar, as shown in FIGS. 3, 4 and 6; 12 to a lead-out cord, as shown in FIGS. 2 and 6; 116 to an armature coil; 56 to a grommet, as shown in FIG. 2; 55 to a brush portion, as shown in FIG. 14; 26 to a brush spring; 22 to a pig tail, as shown in FIGS. 14 and 15; 32 to a thrust absorber, as shown in FIGS. 11 and 12, which engages in a ring-shaped groove 34; 35 to a bearing bush; 36 to an oil seal; 30 to a direct-current motor rotating shaft; 31 to a commutator; 51 to a motor case; 53 to a rotor; and 54 to a stator (permanent magnet), respectively.

Figure 1:
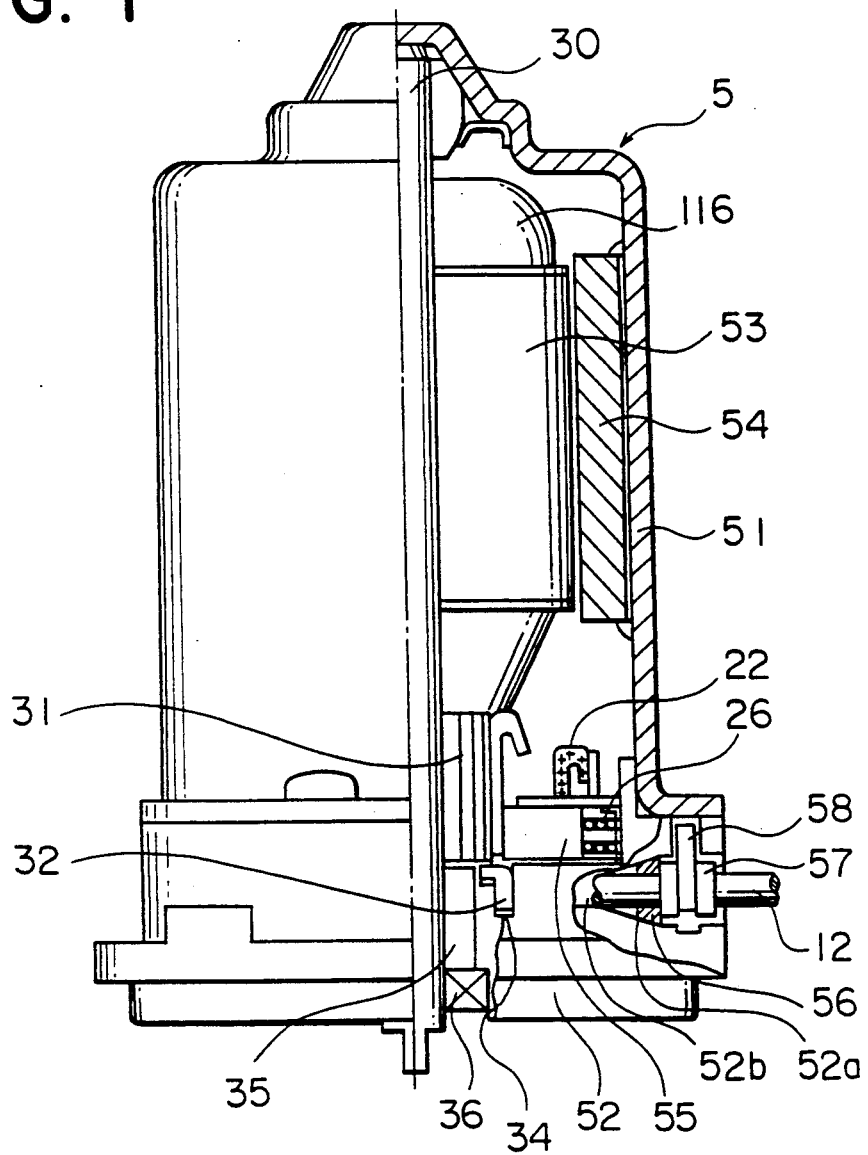
FIG. 1 is a longitudinal section of a direct-current motor used in an outboard engine embodying this invention.

As shown in FIGS. 1 and 2, a hole 52b having a tapered portion 52a is drilled from the side of a front bracket 52 toward the center thereof. Into the hole 52b inserted is a grommet 56 of a truncated conical shape having at the center thereof a hole into which a cord 12 is passed. Furthermore, an I collar 57 having a key groove 57a (FIG. 2) at the center thereof is also inserted into the hole 52b. A key groove 52c is provided on the upper side of the bracket 52 at such a location as to almost align with the key groove 57a provided on the I collar 57 when a truncated cone-shaped grommet 56 and the I collar 57 are inserted into the hole 52b. An I holder shown in FIG. 5 is inserted into these aligned key grooves 52c and 57a as a hold-down means. The I holder 58 has a semi-circular notched portions 58a and a positioning notched portion 58b. In a waterproof construction involving a single cord 12, only one semi-circular notched portion 58a is needed, and no positioning notched portion 58b is necessary.

Next, the method of assembling these components will be described. The cord 12 connected to the brush portion 55 is led to the outside via a hole 52b, inserted into the holes provided on the grommet 56 and the I collar 57, and then inserted into the hole 52b. As the end face of the I collar 57 is pushed from the outside, the grommet 56, while being advanced by the action of the tapered portion 52a of the hole 52b provided on the bracket 52, compresses the cord 12, together with the tapered portion 52a to form an airtight seal. As the I collar 57 is further pushed from the outside until the key groove 57a provided on the I collar 57 coincides with the key groove 52c provided on the upper side of the bracket 52, the I holder 58 is inserted into the key grooves 52c and 57a in the direction shown by an arrow in FIG. 6. By doing this, the I holder 58 serves as a key to secure the grommet 56 in an airtight state.

The I holder 58 is held in position as the case 51 pushes the I holder 58, as shown in FIG. 1.

As described above, this invention provides a motor which has such a simple construction that assembly manhours can be reduced, the waterproofing effect can be fully maintained, and the motor can be installed at any space in the ship because of the lack of protruded portions.

Since the case holds down the I holder, the I holder is prevented from falling off even when exposed to sunlight, leading to highly stable waterproofness.

FIGS. 11 and 12 show a thrust absorber which also serves as a jig for pushing the brush toward the outer peripheral side when the commutator is inserted between the brushes.

In FIG. 1, the commutator 31 for changing over electric current fed to the armature coils 116 is adapted to make sliding contact with the brush 20. Consequently, the commutator 31 has to be inserted between the brushes 20 (shown in FIGS. 14 and 15) in the brush portion 55. Now, the procedures of inserting the commutator will be described, referring to FIGS. 1, 11 and 12. As mentioned earlier, the thrust absorber 32 is used as a jig for inserting the commutator 31 between the brushes 20. The thrust absorber 32 is formed into a ring, and has a slit 33 at a location in the circumferential direction so that the thrust absorber can be elastically deformed, as shown in FIGS. 11 and 12. A ring-shaped groove 34 for receiving the thrust absorber 32 is formed on the front bracket 52. Furthermore, on the front bracket mounted are a bearing bush 35 for supporting the tip of a rotating shaft 30 and an oil seal 36 for preventing oil leaks.

When inserting the commutator 31 between the brushes 20, the thrust absorber is used as a jig. That is, the thrust absorber 32 is inserted between the brushes in FIG. 1 to hold the brushes in a state where the brushes are shifted toward the outer peripheral side in the radial direction. In this state, a rotor 53 is lowered from above in FIG. 1, and the tip of the rotating shaft 30 is inserted into the central hole of the thrust absorber 32. Then, the rotor 53 is gently moved downward. By doing this, the thrust absorber 32 is shifted downward while preventing the brushes 20 from being moved in the direction of the rotating shaft 30 by the spring 26, as shown in the figure. Thus, the commutator 31 can be easily inserted between the brushes 20 that are forced open by the thrust absorber 32 since the diameter of the thrust absorber 32 is made larger than that of the commutator 31. As the rotor 53 is allowed to lower all the way downward, the thrust absorber 32 is separated from the brushes 20 and housed in the groove 34 of the front bracket 52, causing the rotating shaft 30 to make contact with the bearing bush 35 and the oil seal 36. And, the brush portion 55 is forced onto the commutator 31 by the spring 26.

In this way, the direct-current motor according to this invention makes it possible to insert the commutator 31 between the brushes 20 merely by forcing the rotor 53 in a state where the thrust absorber 32 is inserted between the brushes 20. This results in remarkably improved efficiency in assembling the commutator 31 into the motor. Furthermore, the thrust absorber 32 as forced between the brushes 20 receives the end of the commutator 31 in that state, eliminating the need for a washer that had been needed to receive the thrust. This means that the thrust absorber 32 serving as a jig need not be removed after the commutator has been placed in position.

As described above, this invention has such a construction that the diameter of the thrust absorber receiving the end of the commutator is made larger than that of the commutator and the thrust absorber is used as a jig for pushing the brushes toward the outer peripheral side when inserting the commutator between step brushes. With this construction, therefore, there is no need for pulling the brushes by hand toward the outer peripheral side when assembling the rotor into the motor, thus leading to improved working efficiency in assembling the rotor into the motor.

Figure 9:
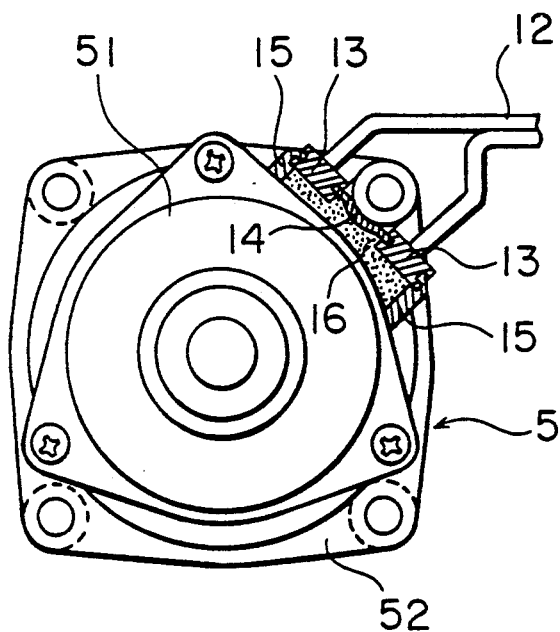
FIGS. 9 and 10 are diagrams illustrating the waterproof construction of the cord outlet of a motor used in a conventional outboard engine.
Figure 10:
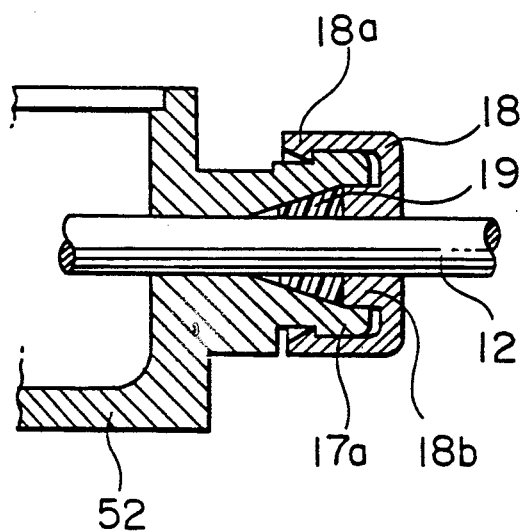
Figure 13:
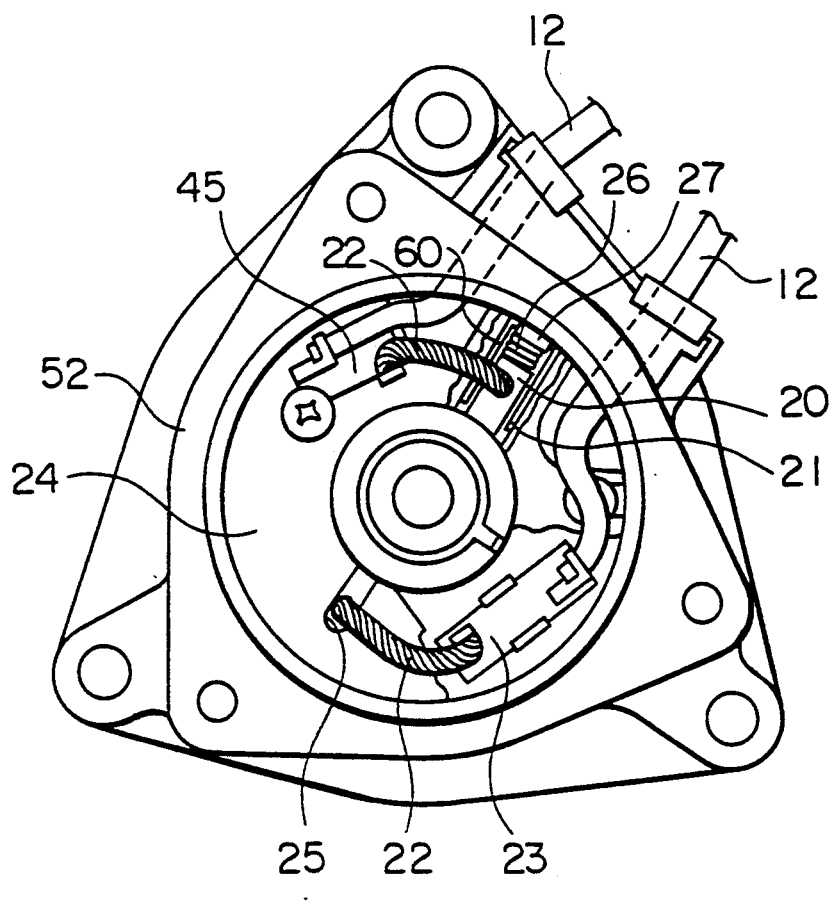
FIG. 13 is a front view of a front bracket showing the state where a rotor and a stator shown in FIG. 1 are removed and showing a circuit breaker positioned behind an insulating plate which is partially broken away.

FIG. 13 is an enlarged front view of the front bracket 52 shown in FIG. 1. Although the front bracket 52 shown in FIG. 9 is of a quadrangular shape, that shown in FIG. 13 is of a triangular shape. The bracket 52 is molded from a synthetic resin and fitted to a case 51 (shown in FIG. 1) by means of a fitting means, which will be described later.

As shown in FIG. 1, a permanent magnet is fixedly fitted to the inner circumferential surface of the case 51 to form a stator 54. An armature coil 116 (FIG. 1) is connected to the commutator 31, and the commutator 31 makes sliding contact with the brushes (FIG. 14). The brush 20 is slidably supported by a brush holder 21, in which a spring 26 is disposed. The spring 26 is adapted to force the brush 20 onto the commutator 31. Thus, electric current is alternately changed over as the armature coil 116 is caused to rotate.

To the brush 20 held by the brush holder 21 connected is a pig tail 22, as shown in greater detail in FIGS. 14 and 15. A circuit breaker 23 is connected to the pig tail connected to one brush 20 and to the cord 12 via the breaker 23. On the other hand, the pig tail connected to another brush 20 is connected to the cord 12 via a terminal 45 (FIG. 13) on an insulating plate 24. On the insulating plate 24, a notch 25 for receiving the pig tail 22 is formed.

The circuit breaker 23 for cutting off excessive current consists of a bimetal plate 40, as shown in FIG. 14, with one end thereof being cantilevered from the base thereof and the other free end thereof having a movable contact 41. The supply of electric current is controlled by causing the movable contact 41 to making contact with or separating from a fixed contact 42. A terminal 43 connected to the fixed contact 42 of the circuit breaker 23 is connected to the pig tail 22, while another terminal 44 is connected to the cord 12. The circuit breaker 23 having such a construction is housed in a recess 59 of the front bracket 52, and the insulating plate 24 is placed on the recess 59.

With the above construction, when power is fed to the armature coil 116 through the brushes 20 and the commutator 31, the rotor of the motor is energized and rotates, and rotor rotation is transmitted to the rotating shaft 30 protruding toward the front end of the front bracket 52. The current fed to the armature coil 116 is alternately changed over by the commutator 31 which makes sliding contact with the brushes 20.

If the current fed to the armature coil 116 exceeds a predetermined value, excessive current is cut off by the circuit breaker 23. The circuit breaker 23 is connected between the cord 12 and the brush 20 and has a bimetal plate 40. Consequently, when the movable contact 41 makes contact with the fixed contact 42, current is caused to flow via the bimetal plate 40. When excessive current flows, the bimetal plate 40 is deformed by Joule heat, causing the movable contact 41 to separate from the fixed contact 42, thus cutting off the drive current. Thus, the armature coil 116 can be protected from excessive current.

The circuit breaker 23 cutting off excessive current in this way is held by the recess 59 of the front bracket 52 without housing in a case. Thus, the need for providing a case specially for the circuit breaker 23 is eliminated. Furthermore, a special holding means is also eliminated since the circuit breaker 23 is held in position by the recess 59. The circuit breaker 23 is held down by the insulating plate 24, which is in turn screwed to the bracket 52. Thus, manhours required for assembling the circuit breaker 23 is materially reduced. Even when the circuit breaker 23 is heated, the heat is dissipated by the entire front bracket 52, leading to improved heat dissipation efficiency.

As described above, this invention has such a construction that a bracket is formed with a synthetic resin molding with a recess thereon so that a circuit breaker is housed in the recess without housing in a case and covered by an insulating plate. With this construction, therefore, the circuit breaker need not be housed in a special case, and no holding means is also needed. Manhours for assembling the circuit breaker can also be reduced.

The construction of a brush portion including the brush 20, the brush holder 21, etc. shown in FIG. 14 is shown in an enlarged view of FIG. 15. As shown in FIG. 15, the front bracket 52 has a pair of recesses 60 which are symmetrical with each other and adapted to house metallic brush holders 21. The brush holder 21 has an open top and an engaging piece 27 facing the open top. The engaging piece 27 is used for engaging the base portion of the spring 26.

On top of the brush holder 21 mounted is the insulating plate 24 which is fixedly fitted to the front bracket 52 with screws. A notch 25 is formed on the insulating plate to receive the pig tail 22 connected to a brush 20. The pig tail connected to one brush 20 is connected to the circuit breaker 23 as shown in FIG. 14, and also connected to the cord 12 via the circuit breaker 23. The pig tail 22 connected to another brush 20, on the other hand, is connected to the cord 12 via the terminal 45 (FIG. 13) on the insulating plate 24.

With the above construction, when power is fed to the armature coil 116 via the brush 20 and the commutator 31, the motor is caused to rotate, and motor rotation is transmitted to the rotating shaft protruding toward the front end of the front bracket 52. The current fed to the armature coil 116 is alternately changed over by the commutator 31 making sliding contact with the brush 20.

The brush 20 is held by the brush holder 21 housed in the recess 60 of the front bracket 52, as described above, and the top portion of the brush holder 21 is opened to facilitate assembly. That is, when the spring 26 and the brush 20 are inserted in the brush holder 21, the top of the brush holder 21 is covered with the insulating plate 24. The engaging piece 27 is used for preventing the spring 26 from popping out of the holder 21. Thus, it is made possible to provide a brush holding device having good assembling efficiency. Furthermore, as the brush 20 is supported by the bracket 52 via the brush holder 21, the front bracket 52 can be protected from heat by the heat insulating effect of the brush holder 21. This prevents the thermal deformation of the bracket 52, and eliminates the need for molding the bracket 52 with a special resin having good heat resistance.

As described above, this invention has such a construction that a bracket is formed with a synthetic resin and a recess is provided on the bracket to house a metallic brush holder with the top thereof being opened. The brush holder holding a brush is covered by an insulating plate. With this construction, therefore, a mechanism for holding brushes that is simple in construction and easy to assemble can be obtained. Furthermore, the use of metallic brush holders makes it possible to protect the bracket from heat, or to mold the bracket from a resin having poor heat resistance.

Figure 16:
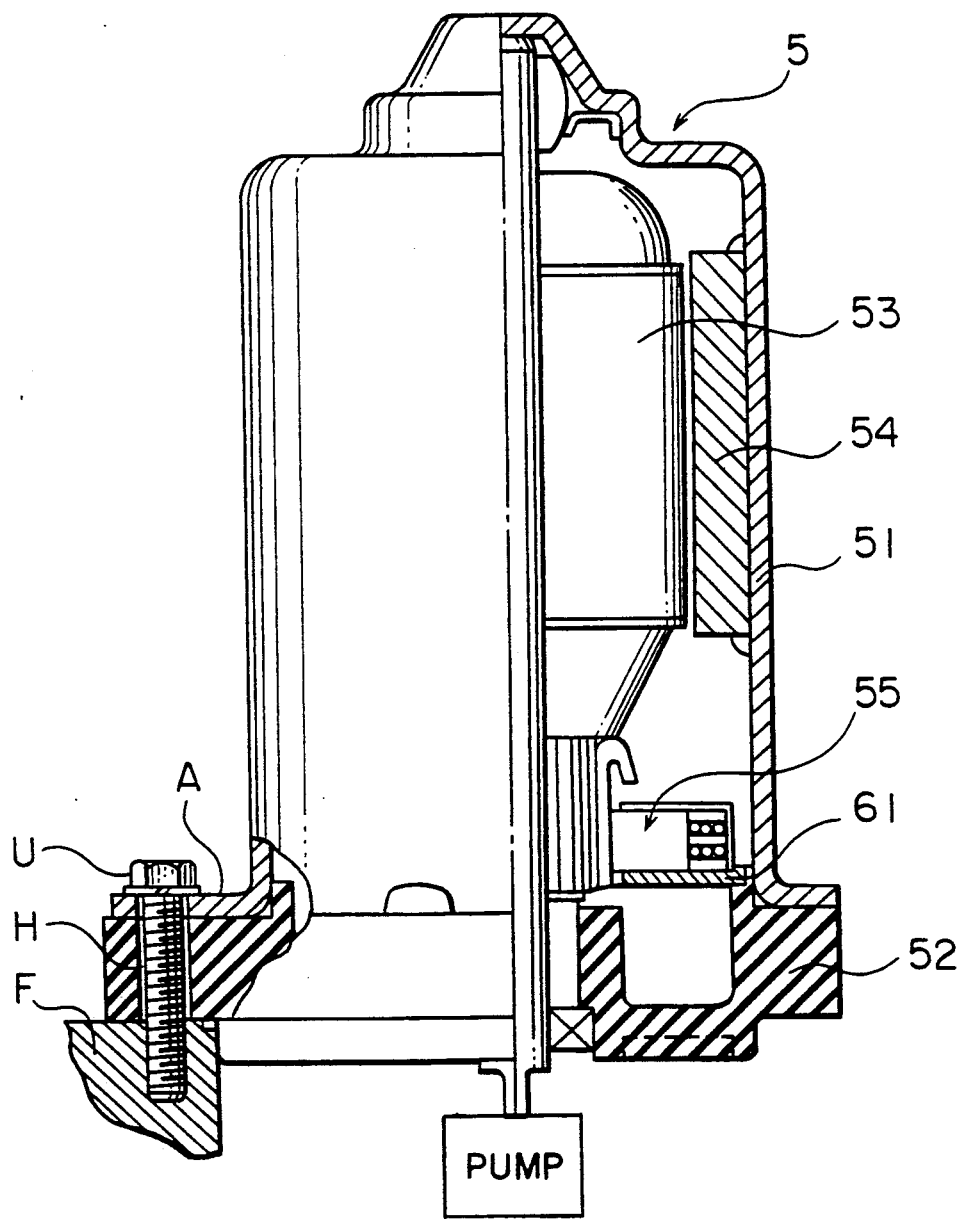
FIG. 16 is a diagram illustrating the state where the bent portion of a yoke and the bracket mounting portion of a direct-current motor of this invention are fastened to fixedly fitted to a pump-side flange.

FIG. 16 illustrate another embodiment of this invention in which a motor case 51 is fixedly fitted to a flange F on the side of a pump 4 via a bracket 52.

As the bracket 52 made of a synthetic resin as used in this invention is inferior in impact resistance to aluminum alloy used in the prior art, the synthetic resin bracket, when fastened directly and tightly with mounting screws or bolts, tends to be easily cracked.

Figure 7A:
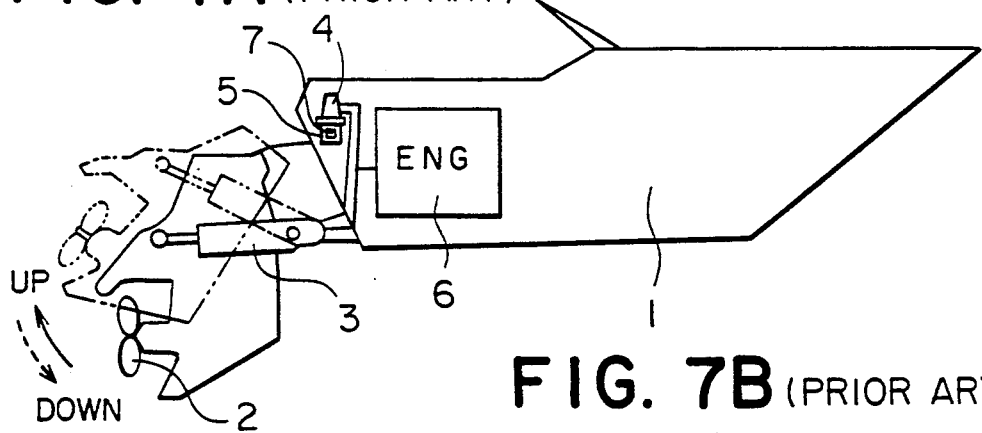
FIGS. 7A and 7B are diagrams of assistance in explaining the control of propeller movement in an outboard engine.

In this invention, however, a bent portion A is provided on the case 51 and a through hole H for a bolt U is provided on the bracket 52, and the bent portion A and the bracket 52 are fastened to a flange F on the side of the pump 4, shown in FIG. 7a. This increase the strength, preventing the flange from cracking due to generation of vibration during installation of the flange, or during operation.

FIG. 21 is a plan view of a brush holding plate 61 shown in FIG. 16. On the brush holding plate 61 mounted are a relay holder 64 shown in FIGS. 17 through 20 and a thermal relay 63 wrapped and supported by the relay holder 64.

In FIGS. 17 through 21, the relay holder 64 has on both ends thereof a terminal 64a connected to a jumper line from the brush 20 and a terminal 64b connected to a lead wire from the power supply; and an electrically conductive member 64c, formed into a strip, wraps the thermal relay 63, which is drawn by imaginary lines and hatched, to form a space to be supported between the terminals 64a and 64b. The space which wraps and supports the thermal relay 63 may be formed by sandwiching the space by two electrically conductive members 64c, as shown in FIGS. 17 through 20, or wrapping the thermal relay 63 entirely with the electrically conductive member 64c.

As shown in FIG. 21, the relay holder 64 is fixedly fitted to the brush holding plate 61, the jumper line of the brush 20 is connected to the terminal 64a, and the lead wire of the power supply connected to the termainal 64b. Consequently, a path for a load current flowing in the motor 5 is formed by the electrically conductive member 64c of the relay holder 64, and Joule heat corresponding to the load current is generated in the relay holder 64. The operating temperature and time of the thermal relay wrapped and supported by the relay holder 63 can be freely determined by changing the thickness, width, material, etc. of the electrically conductive member 64c.

Figure 7B:
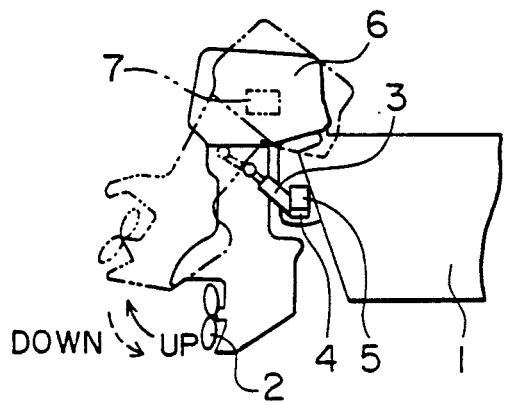

If the propeller 2 cannot be lifted from the sea water in FIG. 7, due to the propeller 2 entangled with something, a large current flows in the motor 5 and the relay holder 64 due to the seizing of the motor. Consequently, Joule heat corresponding to the large current is generated in the relay holder 64, causing a rapid temperature rise in the relay holder 64. The thermal relay 63 coming in close contact with the relay holder 64 directly detects this rapid temperature rise, and is actuated when the temperature rise reaches a predetermined value.

Figure 22:
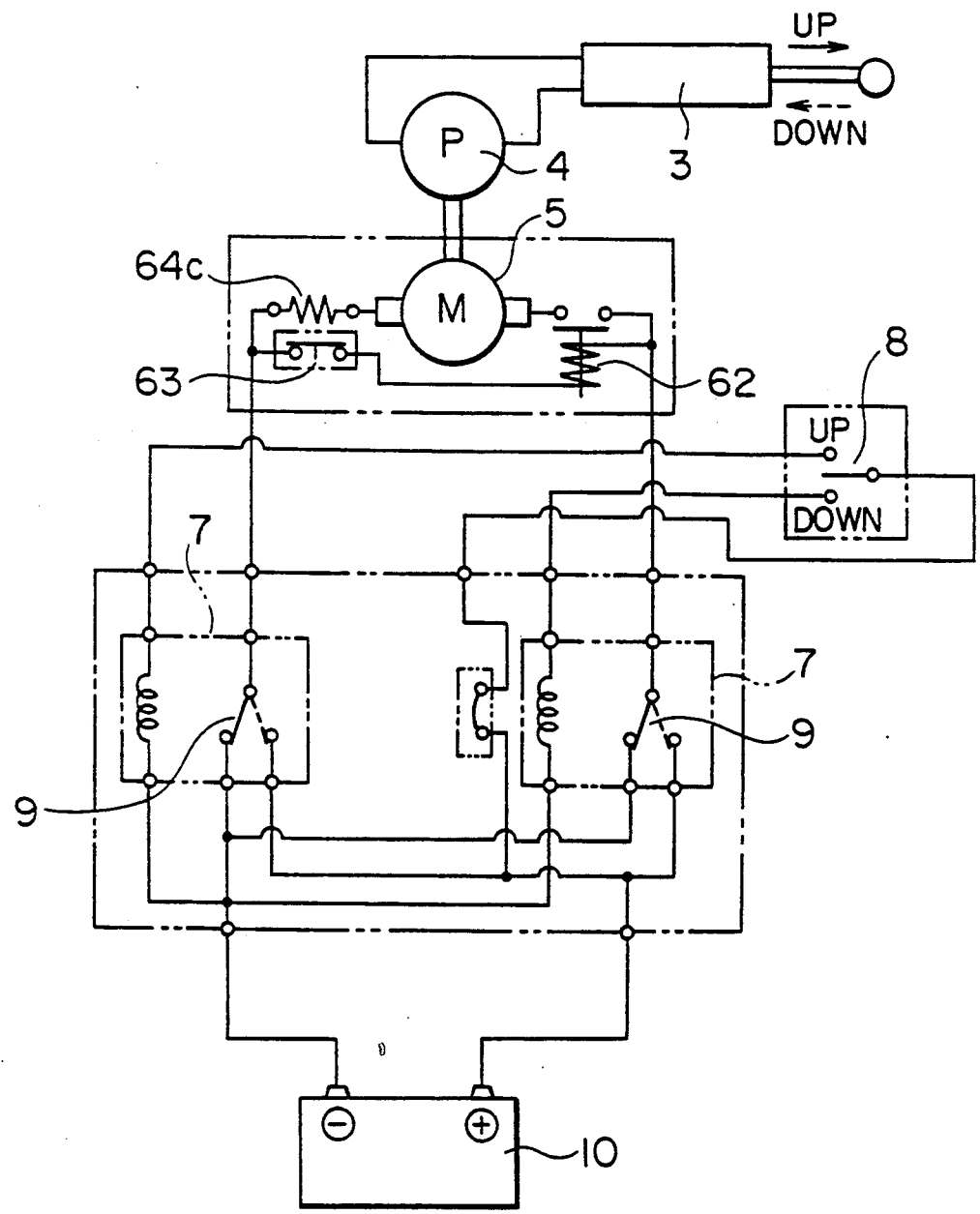
FIG. 22 is a diagram illustrating the construction of an example of a control device for performing the lifting/lowering control of the propeller, in which a temperature protection device for a motor according to this invention is used.
Figure 23:
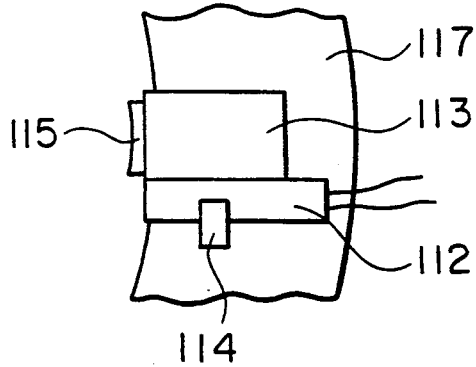
FIG. 23 is a plan view illustrating the mounting position of a thermal relay of a conventional type.
Figure 24:
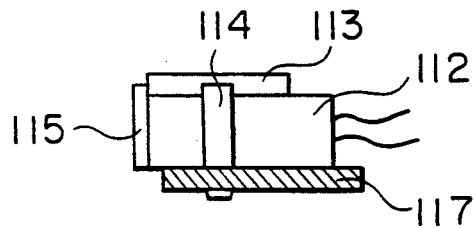
FIG. 24 is a front view of the same.
Figure 25:
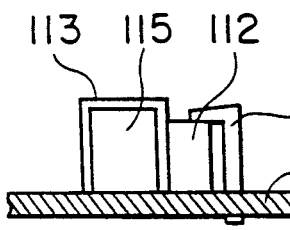
FIG. 25 is a right-side view of the same.

FIG. 22 shows the construction of a control device for performing the lifting/lowering control of the propeller in which the temperature protection device of the motor of this invention is used. The control device shown in FIG. 22 has essentially the same construction as that shown in FIG. 8, except that the thermal relay 63 is directly heat-conducted by the electrically conductive member 64c forming the relay holder 64, as described with reference to FIGS. 17 through 20, and that the electrically conductive member 64c is connected between one brush 20 of the motor 5 and the power supply side of the battery 10.

Consequently, the power relay 62 is deenergized by actuation of the thermal relay 63 caused by rapid generation of Joule heat in the electrically conductive member 64c, cutting off the supply of power to the motor 5 prior to the burning of the motor 5.

Needless to say, even when a continuous overload operation happens for more than rated hours due to causes other than the seizing of the motor, temperature protection of the motor 5 is also effected as the thermal relay 63 is actuated by the heat produced in the relay holder 64.

Since other operations in FIG. 22 are similar to those in FIG. 8, description of them is omitted here.

As described above, according to this invention, temperature protection of the motor is effected even when the temperature of the motor sharply rises as the Joule heat generated in the electrically conductive member is transmitted directly to the thermal relay since an electrically conductive member in which load current flows forms the relay holder which wraps and supports the thermal relay. As the temperature protection device of the motor of this invention automatically reset when the motor temperature lowers, the motor can be easily incorporated in an outboard engine of a hermetically sealed type.

Figure 26:
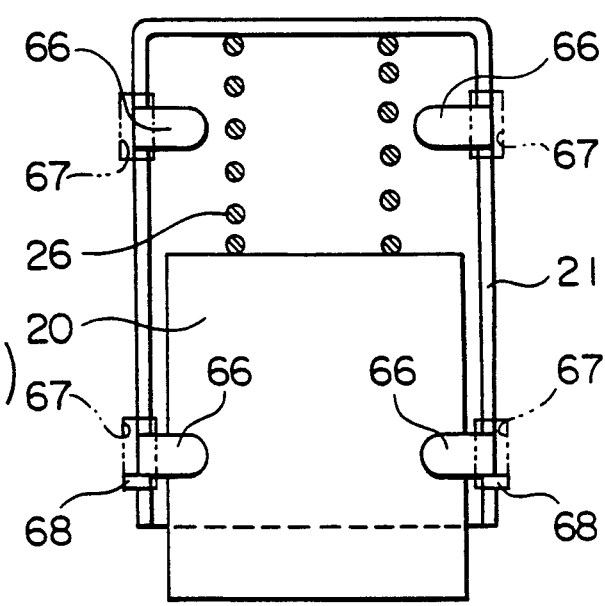
FIG. 26 is a front view illustrating a mechanism for holding a brush in a direct-current motor embodying this invention.
Figure 27:
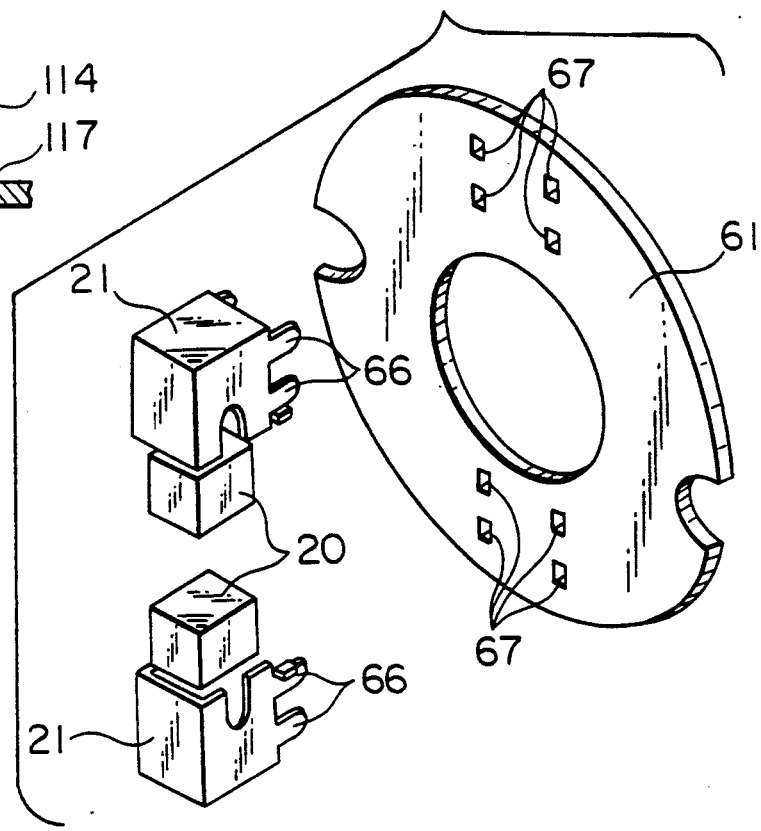
FIG. 27 is an exploded perspective view of the same.
Figure 28:
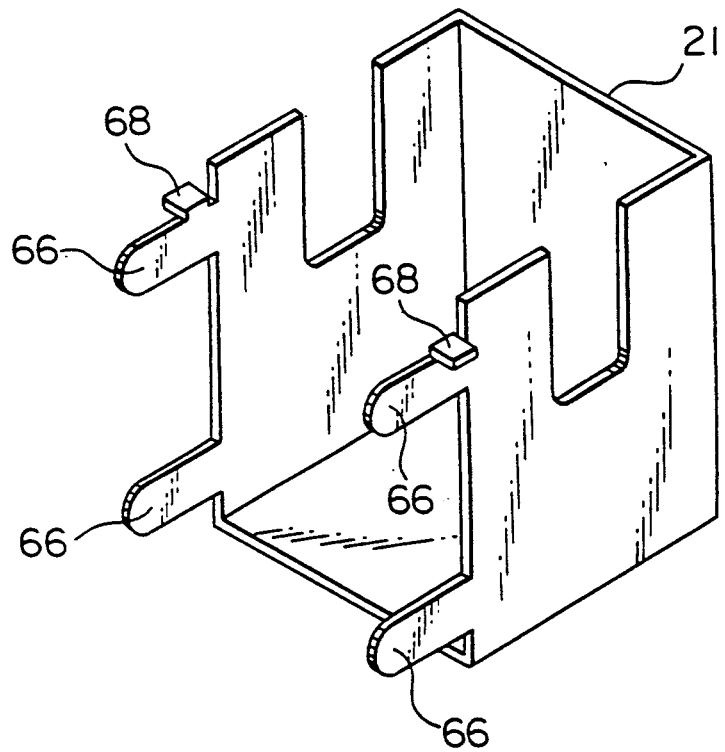
FIG. 28 is a perspective view illustrating the external appearance a holder.

FIGS. 26 through 28 shows the brush holding mechanism of this invention, part of which is shown in FIG. 21.

As shown in FIGS. 26 through 28, the brush 20 is held by the brush holder 21, which has four engaging pieces 66 formed thereon. These engaging pieces 66 are inserted into the engaging holes on the brush holding plate 61 shown in FIG. 27 and bent on the opposite side, as shown in FIG. 26. By doing this, the brush holder 21 is fixedly fitted to the brush holding plate 61. At the foot of the engaging piece 66 on the center side of the brush holder 21 formed is a claw 68 which can be bent sideways. The claw 68 comes in contact with the circumferential side wall of the engaging hole 67 on the center side of the brush holding plate 61, as shown in FIG. 26. This helps prevent the brush 20 from loosening in the circumferential direction.

With the brush holding mechanism of this invention, in which a claw 68 is formed so as to come into contact with the side wall of the engaging hole 67 which is formed with a large clearance with respect to the engaging piece 66 from considerations of the life of stamping dies. This prevents the brush holder 21 from being moved in the circumferential direction by the brush 20. Thus, a low-cost measure of an extremely simple construction prevents the brush holder from moving in the circumferential direction, and also prevents the brush from being tilted, thus leading to elimination of abnormal wear of the brush 20 or poor contact between the brush 20 and the commutator 31.

As described above, this invention makes it possible to prevent the brush holder from loosening by inserting engaging pieces provided on the brush holder into engaging holes on the brush holder and bending the engaging pieces, and providing claws bent at right angles with respect to the engaging pieces and bringing the claws into contact with the circumferential wall surface of the engaging holes. Consequently, this invention makes it possible to prevent the holder from moving in the circumferential direction, and prevent the brush held by the holder from tilting, and thereby eliminate abnormal wear of the brush.

Figure 29:
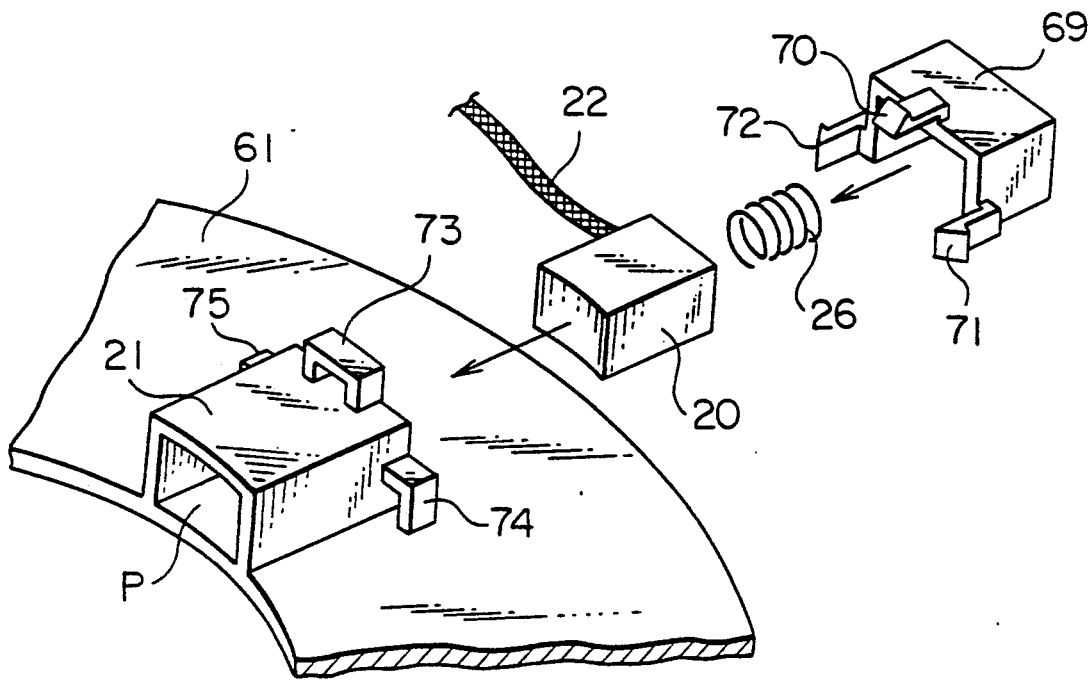
FIG. 29 is an exploded perspective view of the essential part of a mechanism for holding a brush in a direct-current motor embodying this invention.
Figure 32:
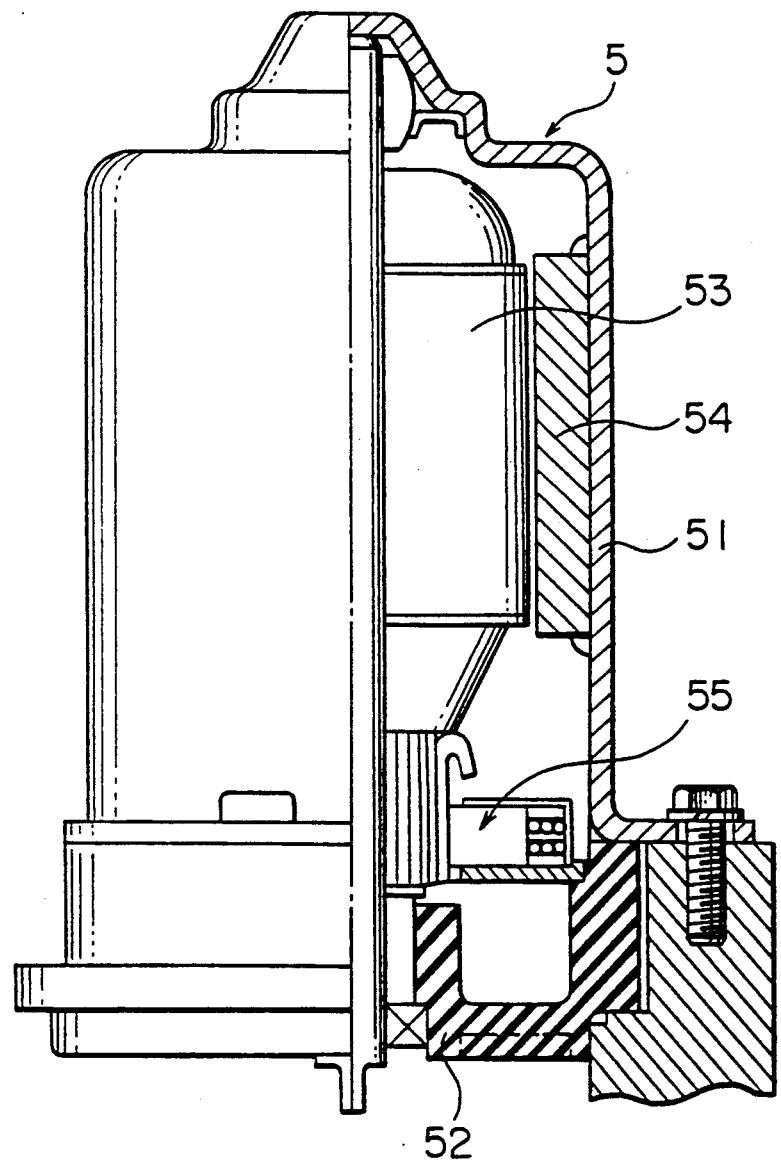
FIG. 32 illustrates a direct-current motor of a conventional type in which a front bracket is molded from a synthetic resin.
Figure 30:
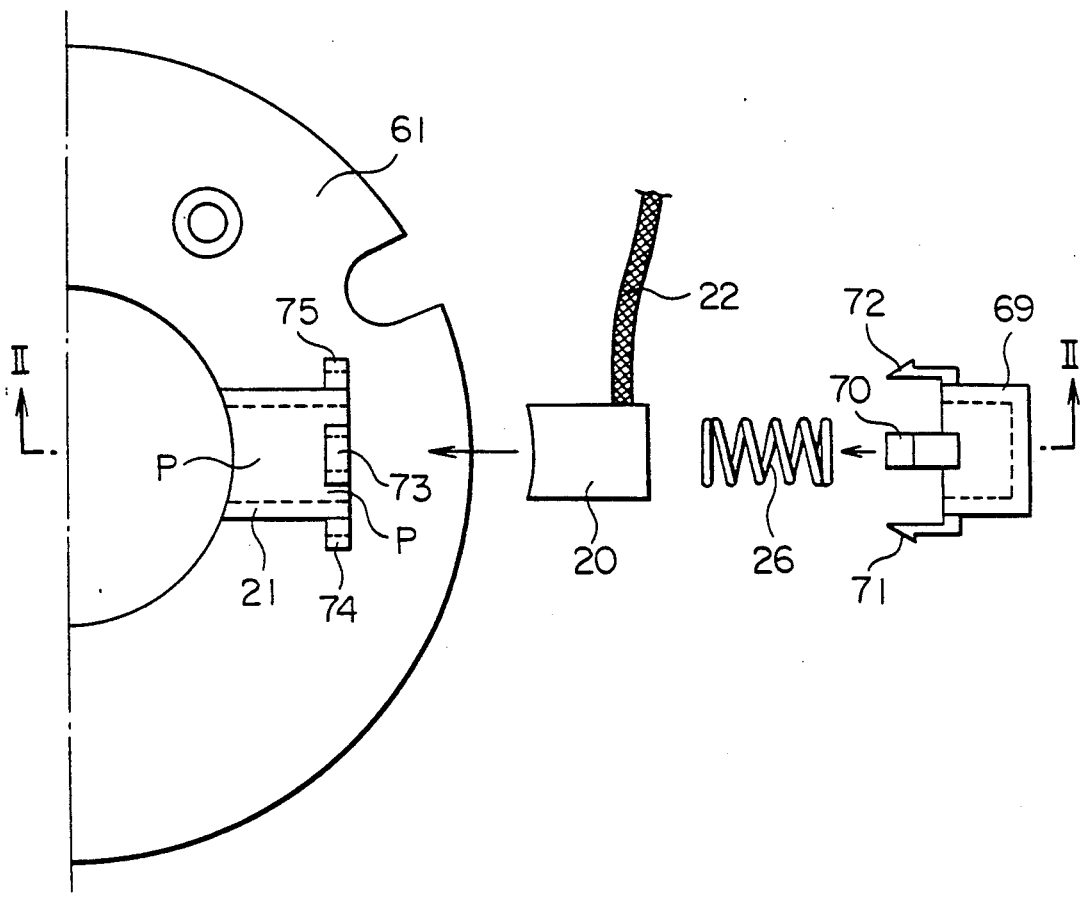
FIG. 30 is a plan view illustrating the essential part of the same.
Figure 31:
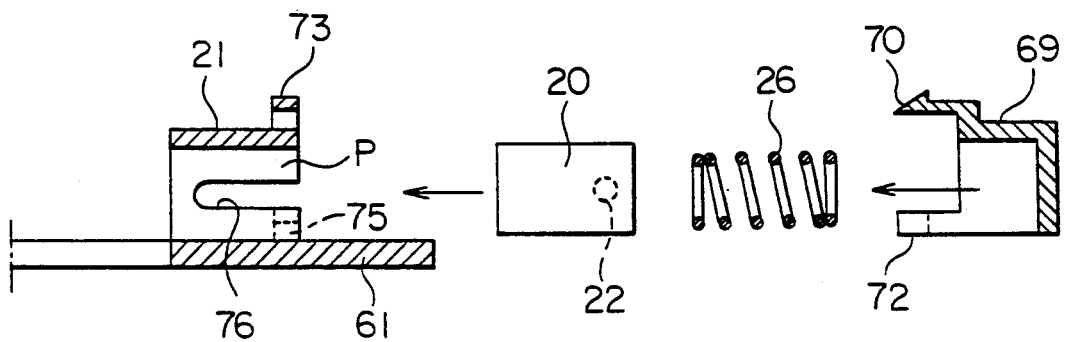
FIG. 31 is a cross-section taken along line III—III in FIG. 30.

FIGS. 29 through 31 illustrate another example of the brush holding mechanism of this invention.

On a brush holding plate 61 integrally formed is a brush holder 21 of a quandrangular cylinder shape. This brush holder 21 has a through hole P opening toward the outer periphery, with a spring receptable 69 being mounted in such a manner as to cover the opening. The spring receptable 69 has claws 70, 71 and 72 on the top, left-side and right-side thereof. The claws 70–72 are engaged with the engaging portions 73, 74 and 75 of the brush holder 21. On the side surface of the brush holder 21 formed in a notch 76 for receiving a pig tail 22.

With the above construction, when drive current is fed from the outside through the pig tail 22, the current flows in the armature coil 116 via the brush 20 and the commutator 31. Since the armature coil 116 is disposed in the field of the magnet, torque is generated to cause the coil 116 to rotate in the case 51. The current flowing in the armature coil 116 in accordance with this rotation is alternately changed over by the commutator 31. Thus, rotation as an output is taken out through the rotating shaft 30.

In the direct-current motor shown in the figure, the mechanism for holding the brush 20 has such a construction as shown in FIGS. 29 through 31, in which the brush holder 21 is integrally provided on the brush holding plate 61. This construction, therefore, can reduce the number of parts compared with the construction in which the brush holder 21 is provided independently of the brush holding plate. Furthermore, this construction makes it possible to assemble the brush 20 after a bearing (not shown) has been mounted between the brush holders 21 on the brush holding plate 61 and the commutator 31 has been mounted. That is, after the commutator 31 has been inserted between the brush holders 21 on the brush holding plate 61, the brush 20 and the spring 26 can be inserted into the opening behind the brush holders 21, and the opening can be closed with the spring receptacle 69. By doing this, the spring 26 pushes the brush 20, which in turn pushes the outer peripheral surface of the commutator 31.

With this construction, working efficiency in motor assembly can be improved. That is, the need for holding the pig tail 22 in hand and keeping the brush 20 shifted to the outer peripheral side in the brush holder 21 while resisting the force of the spring 26 can be eliminated. This construction also facilitate replacement of the brushes 20.

As described above, this invention has such a construction that an opening is provided on the outer peripheral side of the brush holder, and a spring receptacle is detachably provided on the opening to receive a spring for pushing the brush. With this construction, therefore, it is possible to assemble brushes after a commutator has been mounted between brush holders.

What is claimed is:

1. A direct-current motor, including a motor case provided with a substantially bell shape; a front bracket connected to an opening of said motor case, said front bracket being formed of a synthetic resin and defining recesses; brushes held by said front bracket, metallic brush holders being inserted into said recesses, said metallic brush holders having open tops, said brush holders holding said brushes and each of said open tops being covered with an insulating plate; a commutator and a rotor, said commutator being disposed on a side of said rotor and means for urging said brushes for making sliding contact with said commutator for alternatively changing over electric current; and a waterproof construction including a waterproofing bracket having a hole with a tapered inside surface formed on an interior side of said hole, a grommet having a hole through which a cord is passed, said grommet having a tapered outer surface engaging said tapered inside surface of said hole, said grommet being compressed into said hole for said grommet pressing said cord to ensure air tightness; a collar having a hole through which said cord is passed and a key groove formed on an outer surface of said hole of said collar adjacent said tapered inside surface and a holder inserted into said key groove for maintaining said grommet positioned in said bracket hole.

2. A direct-current motor according to claim 1 further comprising a circuit breaker and a recess for housing said circuit breaker, said recess being is provided on said bracket so that said circuit breaker is inserted into said recess without housing said breaker in a case; said recess being covered with said insulating plate.

3. A direct-current motor according to claim 1 wherein power is fed to rotor coils through said brushes held by said front bracket, and engaging pieces are provided on said brush holders, inserted into engaging holes on said insulating plate and bent, and claws are provided in such a manner as to bend at right angles with respect to said engaging pieces; said claws being brought into contact with a circumferential wall surface of said engaging holes to prevent said holders from loosening.

4. A direct-current motor as claimed in claim 3 including means for a motor temperature protection, which is adapted to prevent temperature rise by cutting off power supply by the operation of a thermal relay when motor temperature exceeds a predetermined value is provided on a brush holding plate; said means for temperature protection having such a construction that a relay holder which wraps and supports said thermal relay located on said brush holding plate and is provided and electric current is caused to flow in said motor through said relay holder to protect said motor.

5. A direct-current motor according to claim 1, wherein said brush holders having openings at an outer peripheral side thereof, and spring receptacles are detachably mounted on said openings to receive springs for pushing said brushes.

6. A direct-current motor as claimed in claim 1 wherein through holes for bolt fastening are provided on a bent portion of said case and said bracket; said bent portion and said bracket being fastened to a flange by a bolt.

* * * * *